United States Patent [19]
Hoffman

[11] 3,860,079
[45] Jan. 14, 1975

[54] KNEE-ACTION DEVICE FOR SNOW VEHICLES

[76] Inventor: Elmer Hoffman, 728 Wilson St., Shorewood, Wis. 53066

[22] Filed: Sept. 10, 1973

[21] Appl. No.: 395,727

[52] U.S. Cl. .................................. 180/5 R, 280/25
[51] Int. Cl. .......................................... B62m 27/02
[58] Field of Search .................... 180/5 R, 6; 280/25

[56] References Cited
UNITED STATES PATENTS

| | | | |
|---|---|---|---|
| 3,613,812 | 10/1971 | Hetteen | 180/5 R |
| 3,623,564 | 11/1971 | Higginbotham | 180/5 R |
| 3,777,831 | 12/1973 | Hale | 180/5 R |

*Primary Examiner*—Philip Goodman

[57] ABSTRACT

This device consist primarily of a plate which attaches to the ski of a snowmobile, the plate having lugs to which are attached a shock-absorber assembly used pivotable link members, a pair of the link members having an end formed, so as to abut with the plate so as to prevent the ski from dipping forward when hurdling an object.

3 Claims, 4 Drawing Figures

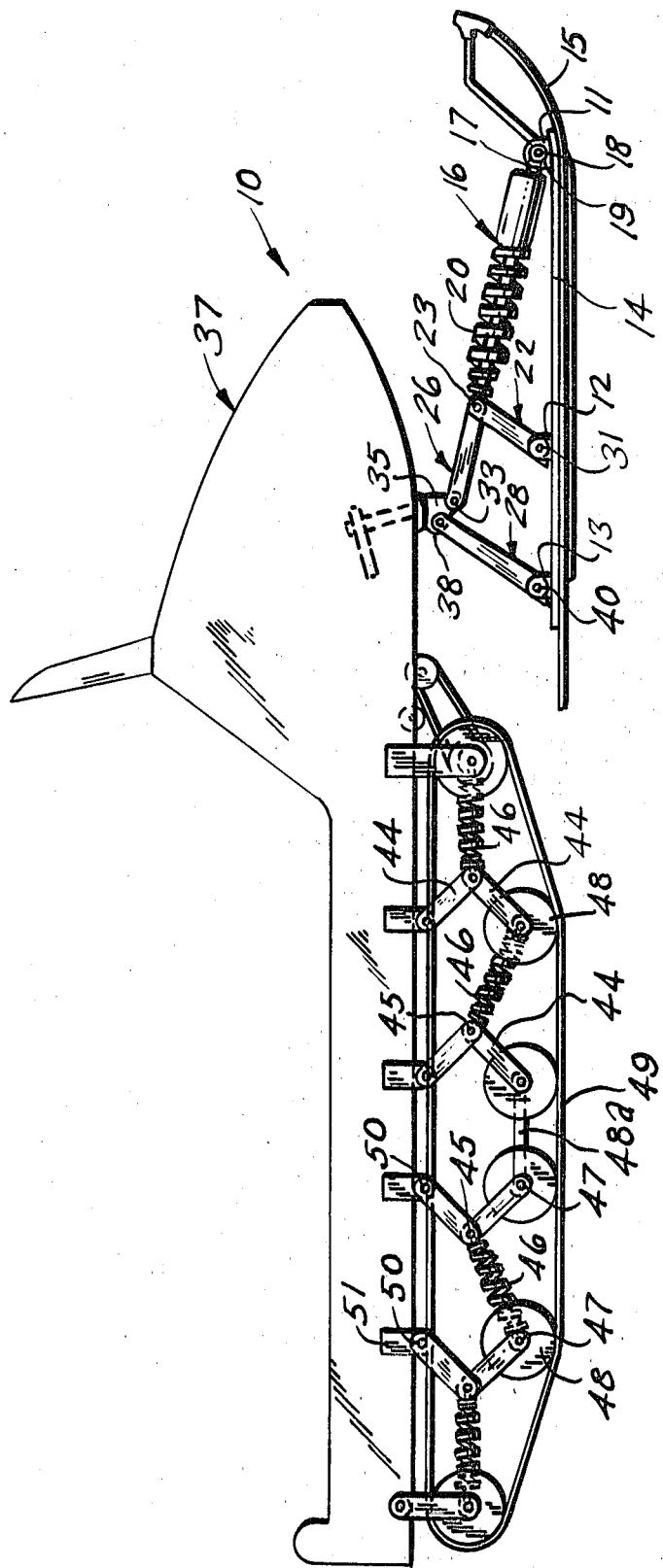

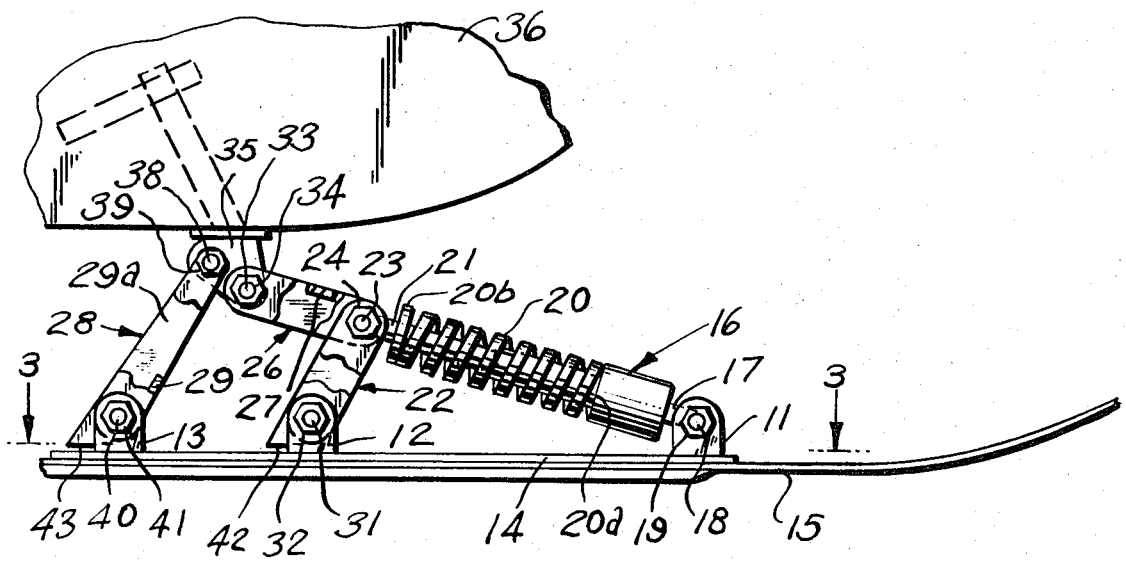
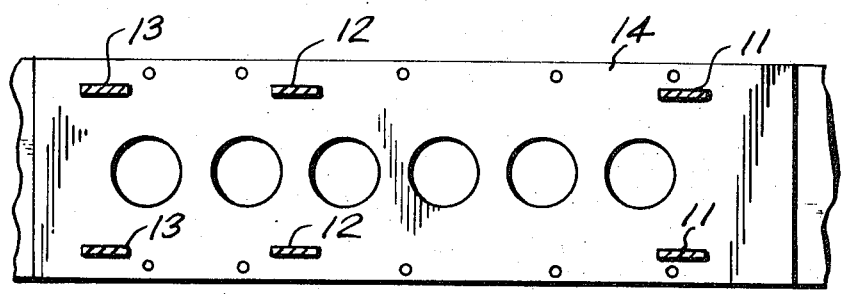
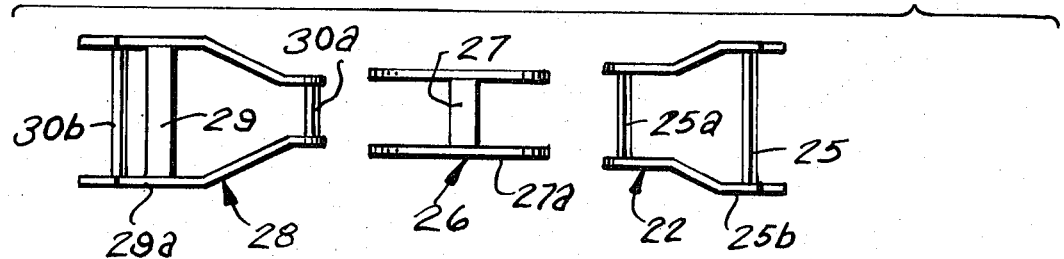

3,860,079

KNEE-ACTION DEVICE FOR SNOW VEHICLES

This invention relates to shock-absorbers and the like.

It is therefore the principal object of this invention to provide a knee-action device for skis of a vehicle.

Another object of this invention is to provide a knee-action device which will have link means that will form stop means against the plate of the shock-absorber assembly upon the ski, so as to prevent the ski from dipping forward when the skis are hurdling an object.

Another object of this invention is to provide a device of the type described, which will include a plate member secured fixedly to the ski, the plate member having lugs extending, one of the lugs being fastened to one end of the shock-absorber assembly and the other lugs being secured pivotably to links which are interconnected pivotably and are attached to a bracket secured to the body of the vehicle.

A further object of this invention is to provide a device of the type described, which will include toggle linkage and spring means for the wheels of the drive portion of the vehicle.

Other objects of this invention are to provide a knee-action device which is simple in design, inexpensive to manufacture, rugged in construction, easy to use and efficient in operation.

These and other objects will be readily evident upon a study of the following specification and the accompanying drawings, wherein:

FIG. 1 is a side view of the present invention shown in elevation;

FIG. 2 is an enlarged fragmentary view of FIG. 1;

FIG. 3 is a cross-sectional view taken along the line 3—3 of FIG. 2;

FIG. 4 is a plan view of the linkage members shown removed from FIG. 2;

According to this invention, a knee action device 10 is shown to include a pair of parallel spaced apart lugs 11, 12 and 13, all of which are fixedly secured to and projecting from a rectangular configurated plate 14 which is suitablly secured, fixedly, to ski 15. A shock-absorber assembly 16 is angualarly positioned above plate 14 and is secured by its shaft 17, to a bolt 18 carried within lugs 11. Bolt 18 threadingly receives a nut fastener 19. A spring 20 carried upon assembly 16, abuts with shoulder 20a, at one end, and springingly urges against a fixedly secured dics 20b upon the rod 21. A bolt 23 is carried transversely of rod 21 and receives a nut fastener 24. Bolt 23 of rod 21 is freely and rotatably carried within sleeve 25 of link 22, the sleeve 25 being fixedly secured between the sides 25b. Link 22 also has positioned between sides 25b, a second sleeve 25a which herein after will be described. A second link 26 is provided with a cross bar 27 which is fixedly secured in a suitable manner between the sides 27a of the link 26 and a third link 28 is provided with a cross bar 29 fixedly secured between the sides 29a. Link 28 is provided with a pair of sleeves 30a and 30b for a purpose which herein after will be described.

Bolt fastener 23 of rod 21, extends through sleeve 25 of link 22 and simultaneously extends through one end of link 26 and the nut fasteners 24 serves to hold link 22 and 26 pivotably together. A bolt fastener 31 extends through lugs 12 and sleeve 25a of link 22 and bolt 31 threadingly carries a nut fastener 32. A Bolt fastener 33 is carried through the opposite end of link 26 and is carried through bracket 35 and is pivotably secured thereto by means of nut fastener 34. The bracket 35 is fixedly secured in a suitable manner, within the body 36 of snow vehicle 37.

A bolt fastener 38 is also carried within bracket 35 and through sleeve 30a of link 28, the bolt fastener 38 carrying a nut fastener 39. A bolt fastener 40 is carried within sleeve 30b of link 28 and is also carried within lugs 13, the bolt fastener 40 receiving nut fastener 41.

Referring now more particularly to FIG. 2 of the drawing, it will be seen that the angular cut end 42 of link 22 and end 43 are of link 28, the respective ends 42 and 43 serve to abut with plate 14 of ski 15, so as to prevent dipping of ski 15 when the vehicle 37 rides over an object or rise.

Referring now to FIG. 1, of the drawing, it will be seen that a plurality of links 44 are connected by pins 45 so as to act as toggle means for shock absorbing with the aid of the attached spring 46. The lower toggle members 45 of the arrangement are secured to pins 47 fastened to the center of wheels 48 within the continuous track 49 a bar 48a is fastened to the center wheels 48 thus renders the assembly stabilized. The pins 50 on the opposite ends of the toggle 44 arrangements, are secured to brackets 51 along the sides of vehicle 37.

The above mentioned spring 46 and toggle 44 arrangments on either side of vehicle 37, serve to absorb shock and provide better stability of vehicle 37 in combination with the device 10.

What I now claim is:

1. A knee-action device for a snow mobile or snow vehicle, comprising a plate secured to a ski of said vehicle, a plurality of lugs carried by said plate with bolt and nut fastener means securing said lugs to a plurality of links, pivotally carried upon a bracket of said vehicle and pivotally securing a shock absorber assembly to said device, one pair of said lugs being parallel spaced apart and pivotally carrying a rod portion of said shock absorber, said rod portion receiving a bolt fastener which serves and secures said shock absorber assembly at one end to said lugs by nut fastener means, and the opposite end of said shock absorber pivotably carrying a bolt fastener secured between a two sided link which includes an angularly cut end for abutment with said plate and said end of said shock absorber assembly also carrying a two sided link which is pivotably secured to a bracket secured fixedly to said body of said vehicle, said links being secured to said shock absrober assembly and said lugs and bracket by bolt fastener and nut fastener means.

2. The combination according to claim 1, wherein A two sided link having cross bar means there between, is also secured pivotably to said bracket at one end and is pivotably secured to a pair of lugs of said plate at the opposite end, said link being fastened thereto, by means of bolt and nut fastener means and the combination of said links having the ends cut at an angle, serve as stop means against said plate so as to prevent said ski from dipping downwards after hitting an obstacle, the arrangement acting in conjunction with the drive track and wheel assembly which carry a plurality of pivotable toggle members.

3. The combination according to claim 2, wherein said toggle members are secured pivotably at one end to the wheels within the track of said vehicle and are secured pivotably at the oposite end, to bracket means secured to the body of said vehicle, said springs being attached to said toggles and said wheels.

* * * * *